United States Patent [19]

Kim et al.

[11] Patent Number: 5,009,788

[45] Date of Patent: Apr. 23, 1991

[54] METHOD FOR REMOVING ORGANIC AND TUNGSTEN FROM SODIUM SULFATE SOLUTION

[75] Inventors: Tai K. Kim; Clarence D. Vanderpool, both of Towanda, Pa.

[73] Assignee: GTE Products Corporation, Stamford, Conn.

[21] Appl. No.: 504,478

[22] Filed: Apr. 4, 1990

[51] Int. Cl.$^5$ .............................................. B01D 11/04
[52] U.S. Cl. ...................................... 210/639; 423/54
[58] Field of Search .................. 210/634, 639; 423/54

[56] References Cited

U.S. PATENT DOCUMENTS 4,379,126  4/1983  Kim et al. .............................. 423/54

Primary Examiner—Frank Spear
Attorney, Agent, or Firm—Robert E. Walter

[57] ABSTRACT

A method is disclosed for removing organic and tungsten from sodium sulfate solutions to render the solutions suitable for ion membrane processing, which comprises contacting the solution wherein the pH of the solution is no greater than about 7, with activated carbon to remove essentially all of the organic and the tungsten therefrom and form a purified sodium sulfate solution.

1 Claim, No Drawings

METHOD FOR REMOVING ORGANIC AND TUNGSTEN FROM SODIUM SULFATE SOLUTION

BACKGROUND OF THE INVENTION

This invention relates to a method for purifying sodium sulfate solutions of organic and tungsten in order that the sodium sulfate solution can be further processed by ion membrane technology to recover reagent materials.

In the processing of tungsten, tungsten is extracted from sodium tungstate solutions in a liquid-liquid extraction system. In this type of system, tungsten is extracted from a sodium tungstate solution by an organic extracting agent dissolved in a solubilizer. Sodium sulfate solutions are generated as raffinates from the operation of this system. These solutions present a waste removal problem. These solutions can be processed by ion membrane technology to recover sodium hydroxide and sulfuric acid which are usable products. This process avoids production of a waste stream. In ion membrane technology, a cell using ion exchange membranes is used. This cell is a critical part of the process and requires the use of purified solutions since any ion above monovalent contaminates the membranes and renders them inoperative. Some impurities in these solutions are tungsten and residual organic from the liquid-liquid extraction system. One typical organic system makes use of amines as the extracting agent and one or more commercial aromatic solvents. In ion membrane processing, tungsten in the sodium sulfate precipitates and plugs the membranes. Organics in the sodium sulfate solutions dissolve the membranes.

It would be advantageous therefore to purify these solutions of tungsten and organics so that they can be processed to recover usable materials.

SUMMARY OF THE INVENTION

In accordance with one aspect of the invention, there is provided a method for removing organic and tungsten from sodium sulfate solutions to render the solutions suitable for ion membrane processing, which comprises contacting the solution wherein the pH of the solution is no greater than about 7, with activated carbon to remove essentially all of the organic and the tungsten therefrom and form a purified sodium sulfate solution.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention affords a method for purifying sodium sulfate solutions or organic and tungsten. The solutions therefore are not discarded as waste material but can be further processed to recover reagent materials for example, sodium hydroxide and sulfuric acid.

The typcial source of the starting sodium sulfate solutions is the raffinate from solvent extraction processing to recover tungsten from sodium tungstate solutions. In the solvent extraction processing, usually an amine is used as the extracting agent which is dissolved in a solvent which is normally an aromatic solvent. Typically the sodium sulfate raffinates contain about 5 to about 100 mg/l total oxidizable carbon (TOC), and about 0.5 to about 25 mg W/l. The solutions contain typically about 150 to about 200 g $Na_2SO_4$/l.

The sodium sulfate solution is contacted with activated carbon which removes essentially all of the organic and the tungsten. This is ordinarily done by passing the solution through a column of the activated carbon. It is critical that the pH of the sodium sulfate solution be no greater than about 7 to remove the tungsten. Tungsten is not removed by activated carbon from basic solutions.

For the purposes of the present invention, care must be taken that the sodium sulfate solution is not contaminated with any other impurities after it has been purified of tungsten and organic so that it can be used in ion membrane processing. Therefore the activated carbon itself must be as pure as possible in order to prevent contamination of the purified sodium sulfate. Therefore the activated carbon is preferably the purified form. In addition, to insure purity of the activated carbon, it is normal procedure to first pre-treat the activated carbon to remove any fine particles and any impurities especially metallic ions contained therein. This is done by first heating the activated carbon and slurrying it in sulfuric acid. The washing can be done by any technique. Normally the activated carbon is slurried in the sulfuric acid wash. This can be followed by washing the activated carbon in a column with more sulfuric acid. The sulfuric acid washed activated carbon is then washed with water. This is normally done by passing water through the activated carbon in a column.

The activated carbon that is typically used is calgon activated carbon Type F 400, although any suitable commercial activated carbon can be used. Details of the preferred procedure for practicing the present invention are given in the Example that follows.

To more fully illustrate this invention, the following non-limiting example is presented.

EXAMPLE

Sodium sulfate solutions for this procedure are raffinates from a solvent extraction system for tungsten. The sodium sulfate solution contains about 184 g $Na_2SO_4$/l, about 15.3 mg of Total Oxidizable Carbon (TOC)/l, and about 3.6 mg W/l and is at a pH of about 1.6. About 13,000 ml of the solution is passed through a one inch diameter column containing about 100 g of calgon activated carbon Type F 400 at a flow rate of about 13 ml/min. The results are summarized in the Table.

TABLE

| Fraction | Total effluent ml | TOC mg/l | W mg/l |
| --- | --- | --- | --- |
| Control |  | 15.3 | 3.6 |
| 1 | 1250 | 0.6 | 0.3 |
| 2 | 1750 | 0.7 | 0.3 |
| 3 | 2250 | 0.8 | 0.3 |
| 4 | 3750 | 1.2 | 0.3 |
| 5 | 5250 | 1.4 | 0.5 |
| 6 | 6250 | 1.6 | 0.3 |
| 7 | 7250 | 1.8 | 0.5 |
| 8 | 9750 | 2.0 | 0.6 |
| 9 | 10250 | 2.0 | 0.7 |
| 10 | 12250 | 10.4 | 4.4 |

The results show that both tungsten and organic are effectively removed by the activated carbon prior to breakthrough (Fraction #10).

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for removing organic and tungsten from sodium sulfate solutions to render said solutions suitable for ion membrane processing, said method comprising contacting said solution wherein the pH said solution is no greater than about 7, with activated carbon to remove essentially all of said organic and said tungsten therefrom and form a purified sodium sulfate solution, said solution being suitable for ion membrane processing.

* * * * *